(12) United States Patent
Krol et al.

(10) Patent No.: US 12,172,236 B2
(45) Date of Patent: Dec. 24, 2024

(54) PRODUCTION OF THREE-DIMENSIONAL WORKPIECES BY MEANS OF A PLURALITY OF IRRADIATION UNITS

(71) Applicant: SLM Solutions Group AG, Luebeck (DE)

(72) Inventors: Toni Adam Krol, Luebeck (DE); Andreas Wiesner, Luebeck (DE); Christiane Thiel, Luebeck (DE); Lukas Roesgen, Luebeck (DE); Felix Mutz, Luebeck (DE); Naveed Iqbal, Luebeck (DE); Jan Wilkes, Luebeck (DE); Karsten Huebinger, Luebeck (DE); Dieter Schwarze, Luebeck (DE); Simon Steven, Luebeck (DE); Arne Neef, Luebeck (DE)

(73) Assignee: Nikon SLM Solutions AG, Luebeck (DE)

( * ) Notice: Subject to any disclaimer, the term of this patent is extended or adjusted under 35 U.S.C. 154(b) by 1158 days.

(21) Appl. No.: 16/369,388

(22) Filed: Mar. 29, 2019

(65) Prior Publication Data
US 2019/0224913 A1    Jul. 25, 2019

Related U.S. Application Data

(63) Continuation of application No. PCT/EP2017/074184, filed on Sep. 25, 2017.

(30) Foreign Application Priority Data
Sep. 29, 2016   (DE) ...................... 10 2016 218 887.9

(51) Int. Cl.
B29C 64/00     (2017.01)
B22F 12/45     (2021.01)
(Continued)

(52) U.S. Cl.
CPC ............ *B23K 26/354* (2015.10); *B22F 12/45* (2021.01); *B29C 64/153* (2017.08); *B29C 64/20* (2017.08);
(Continued)

(58) Field of Classification Search
CPC .............................. B29C 64/153; B33Y 30/00
See application file for complete search history.

(56) References Cited

U.S. PATENT DOCUMENTS 9,186,847 B2   11/2015  Fruth et al.
9,827,632 B2   11/2017  Eibl et al.
(Continued)

FOREIGN PATENT DOCUMENTS

CN    105814759 A    7/2016
DE   102009037815 A1  2/2011
(Continued)

OTHER PUBLICATIONS

Anonymous: "Laser diode—Wikipedia", as see https://en.wikipedia.org/w/index.php?, Sep. 24, 2016.
(Continued)

*Primary Examiner* — Nicholas R Krasnow
(74) *Attorney, Agent, or Firm* — Taft Stettinius & Hollister LLP

(57) ABSTRACT

The application relates to a device for producing three-dimensional workpieces, the device including: a structural surface designed to receive a molding compound; and an irradiation arrangement designed to selectively irradiate the molding compound on the structural surface with electromagnetic radiation, in order to produce a workpiece by means of generative layer construction, where the irradiation device comprises a plurality of irradiation units, the irradiation units being designed to irradiate an individual region of the structural surface respectively associated with the irra-
(Continued)

diation units, and where the beams emitted by the irradiation units respectively have a cross-sectional surface corresponding to between approx. 2% and approx. 170% of the surface of the respectively associated individual region. The application also relates to the use of such a device and to a method for producing three-dimensional workpieces by means of such a device.

14 Claims, 6 Drawing Sheets

(51) Int. Cl.
    *B23K 26/354* (2014.01)
    *B29C 64/153* (2017.01)
    *B29C 64/20* (2017.01)
    *B29C 64/277* (2017.01)
    *B33Y 30/00* (2015.01)
    *B22F 10/28* (2021.01)
    *B22F 12/13* (2021.01)

(52) U.S. Cl.
    CPC ............ *B29C 64/277* (2017.08); *B33Y 30/00* (2014.12); *B22F 10/28* (2021.01); *B22F 12/13* (2021.01); *Y02P 10/25* (2015.11)

(56) References Cited

U.S. PATENT DOCUMENTS

| | | | |
|---|---|---|---|
| 2002/0164069 A1* | 11/2002 | Nagano | B29C 64/129 382/154 |
| 2014/0263209 A1 | 9/2014 | Burris et al. | |
| 2015/0165556 A1 | 6/2015 | Jones et al. | |
| 2015/0174823 A1 | 6/2015 | Wiesner et al. | |
| 2016/0322777 A1* | 11/2016 | Zediker | G02B 27/0922 |
| 2017/0021455 A1* | 1/2017 | Dallarosa | B22F 12/41 |
| 2018/0193955 A1* | 7/2018 | Karp | B33Y 30/00 |
| 2018/0272611 A1 | 9/2018 | Gerd et al. | |
| 2018/0326655 A1 | 11/2018 | Herzog | |
| 2021/0268789 A1* | 9/2021 | Jones | B22F 12/45 |

FOREIGN PATENT DOCUMENTS

| | | |
|---|---|---|
| DE | 102015216583 A1 | 3/2017 |
| DE | 102015119745 A1 | 5/2017 |
| EP | 2818305 A1 | 12/2014 |
| WO | 2014199134 A1 | 12/2014 |
| WO | 2014199149 A1 | 12/2014 |
| WO | 2015003804 A1 | 1/2015 |
| WO | 2015091458 A1 | 6/2015 |
| WO | WO2015134075 A2 | 9/2015 |
| WO | 2016077250 A1 | 5/2016 |
| WO | 2016085965 A1 | 6/2016 |
| WO | 2016110440 A1 | 7/2016 |
| WO | 2016159768 A1 | 10/2016 |

OTHER PUBLICATIONS

Chinese Office Action, Chinese Appln. No. 201780068791.3, 11 pgs., dated Dec. 11, 2020.
European Patent Office, International Search Report & Written Opinion in corresponding Application No. PCT/EP2017/074184, dated Dec. 6, 2017, 12 pp.
European Patent Office, International Preliminary Report on Patentability in corresponding Application No. PCT/EP2017/074184, dated Dec. 19, 2018, 19 pp.
G. Derra, "High-power VCSELs for building planes and sequencing genes," Industrial Laser Solutions for Manufacturing, dated Mar. 17, 2015, 6 pp., available at https://www.industrial-lasers.com/articles/print/volume-30/issue-2/features/high-power-vcsels-for-building-planes-and-sequencing-genes.html.

* cited by examiner

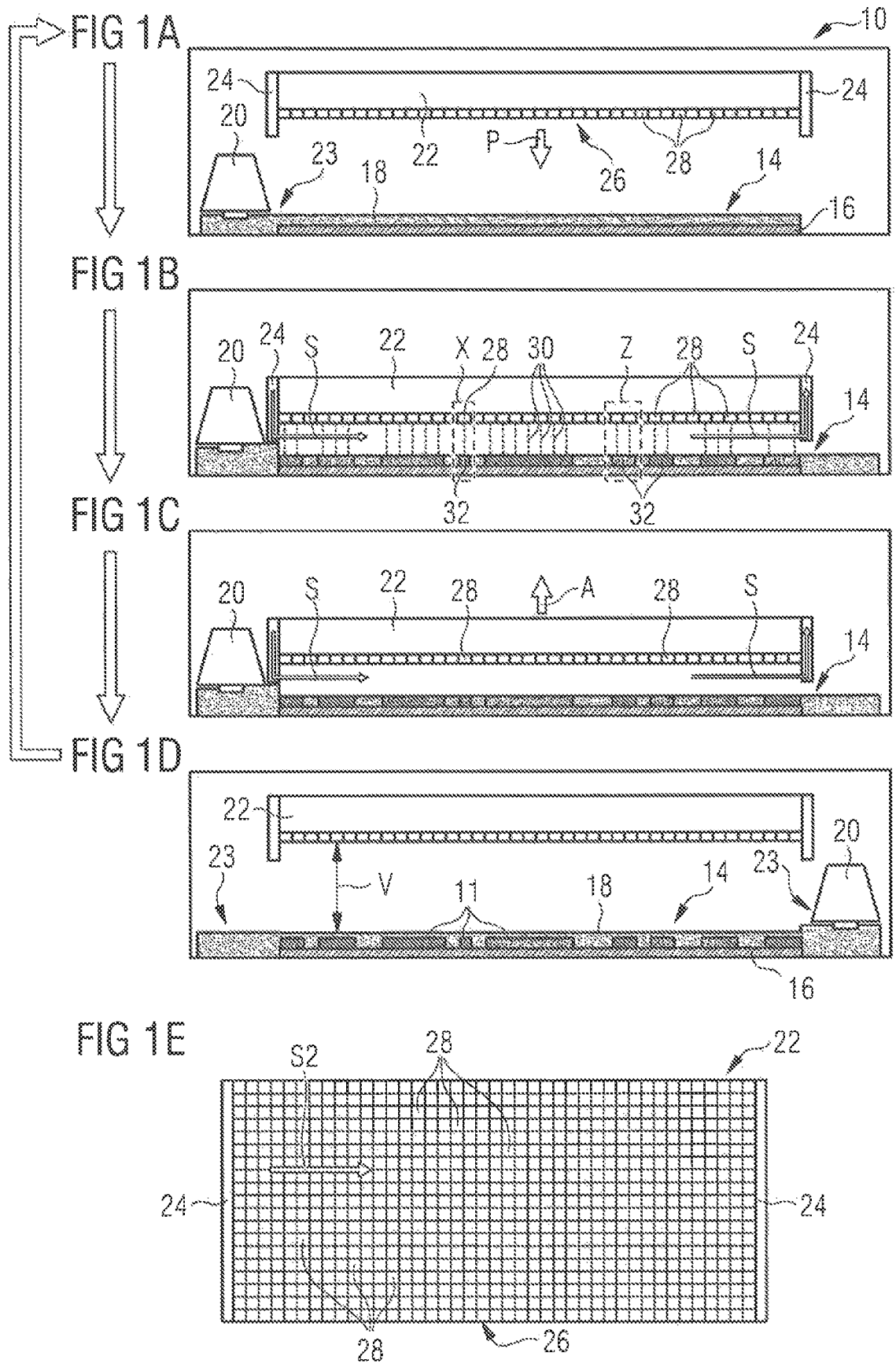

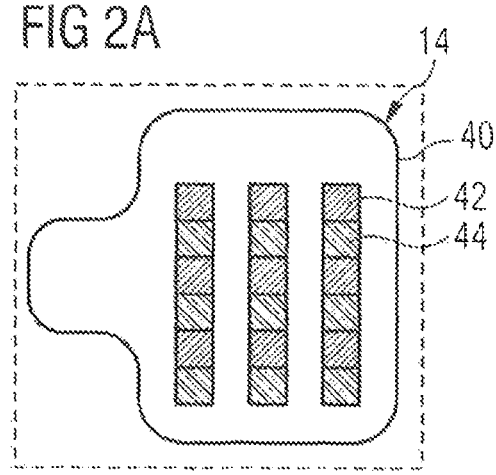
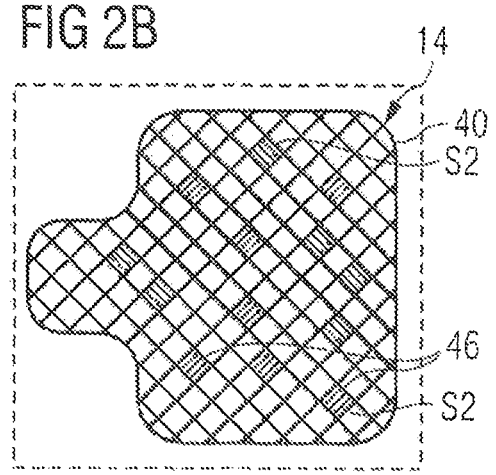
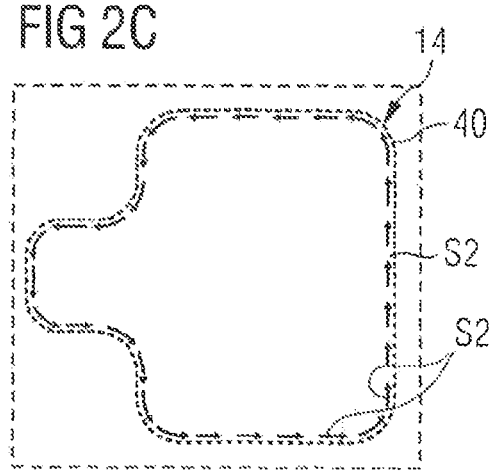

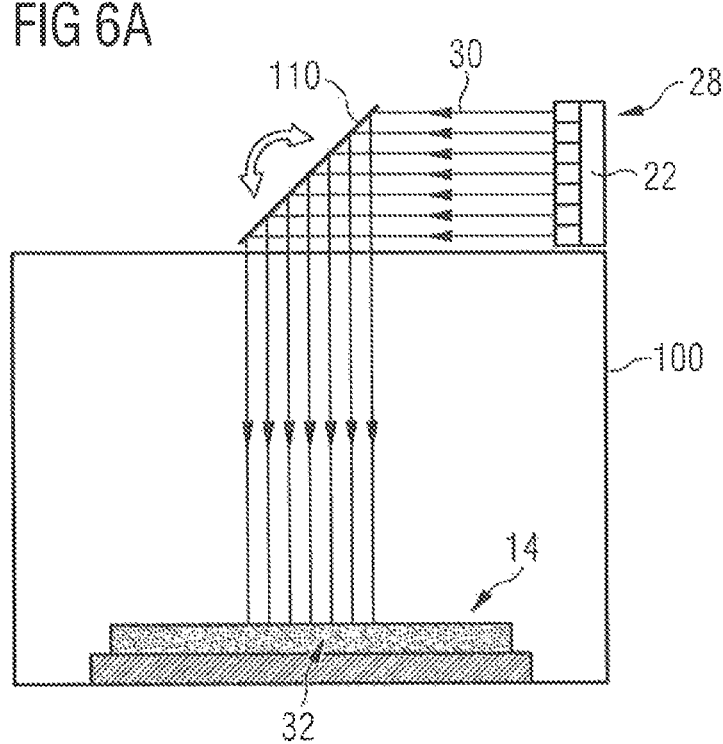
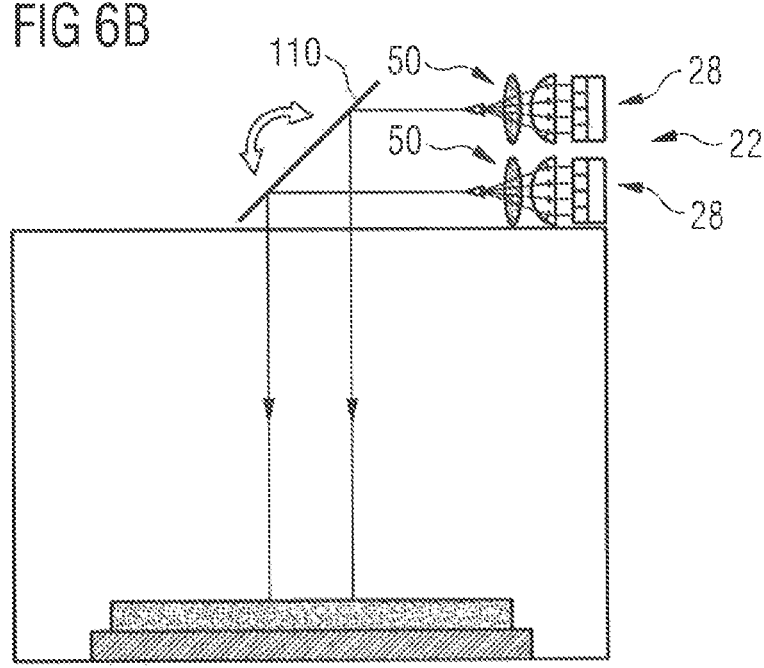

PRODUCTION OF THREE-DIMENSIONAL WORKPIECES BY MEANS OF A PLURALITY OF IRRADIATION UNITS

The invention relates to a device and a method for producing three-dimensional workpieces by means of an additive layer manufacturing method using a plurality of irradiation units, and to the use of such a device.

In additive layer manufacturing methods, it is known to bring an initially shapeless or shape-neutral molding compound into a desired shape by irradiation and in particular to solidify it in that shape and thereby produce a three-dimensional workpiece layer by layer. This can be achieved in particular by irradiation by means of electromagnetic radiation, for example in the form of laser radiation. In a starting state, the molding compound can initially be in the form of granules, powder or liquid molding compound and can be selectively, or location-specifically, solidified as a result of the irradiation. The molding compound can comprise, for example, ceramics, metal or plastics materials and also material mixtures thereof. A variant of additive layer manufacturing methods relates to so-called powder bed fusion, in which in particular metal and/or ceramics powder materials are solidified and shaped to form three-dimensional workpieces.

In order to produce individual workpiece layers it is further known to apply the molding compound to a build surface and irradiate it selectively and in accordance with the geometry of the workpiece layer that is currently to be produced. The laser radiation penetrates the molding compound and solidifies it, for example as a result of heating, which causes fusion or sintering. Once a workpiece layer has solidified, a new layer of unprocessed molding compound is applied to the workpiece layer which has already been produced, for example by means of known coater arrangements. The molding compound layer which is now uppermost and is as yet unprocessed is then irradiated. Consequently, the workpiece is gradually built up layer by layer, each layer defining a cross-sectional area of the workpiece. It is further known in this connection to use CAD or comparable workpiece data in order to produce the workpieces substantially automatically.

The above fundamental aspects can likewise be provided in the present invention. In order to carry out the selective irradiation of the molding compound, however, hitherto complex optics and deflection devices, for example in the form of so-called scanner units, are required. Starting from a radiation source, these devices allow the electromagnetic radiation, for example in the form of a laser beam, to be directed flexibly at predetermined regions of the build surface and the molding compound applied thereto. However, this increases the processing time, because the beam must be guided in the form of so-called individual irradiation vectors along the surface of the molding compound. Thus, for the production of filled or solid workpiece layers, oscillating laser beam deflections along given scan vectors are often required, which must travel over the entire workpiece layer. This increases the manufacturing time and reduces the efficiency of the production process.

Accordingly, an object of the present invention is to provide a solution for producing three-dimensional workpieces by means of an additive layer manufacturing method which is improved in respect of its efficiency.

To that end there is provided a device for producing three-dimensional workpieces, wherein the device comprises a build surface which is adapted to receive a molding compound. The build surface can in known manner be provided within, or on a carrier of, the device. The carrier and/or the build surface can be located substantially opposite an irradiation arrangement of the device, which will be described hereinbelow, and can also be movable relative thereto. For example, the build surface can generally be capable of being raised and/or lowered vertically. In general terms, the build surface can accordingly be movable relative to the irradiation arrangement in and/or contrary to the build direction, wherein the build direction can relate to the layering sequence or increasing build size of the workpiece. It will be appreciated that either the build surface, or the carrier, and/or the irradiation arrangement can be driven in order to carry out the corresponding movements. In particular, the irradiation arrangement, for carrying out an irradiation, can be capable of being arranged in the immediate vicinity of the build surface (for example at a distance of less than 50 mm or less than 30 mm), but can also selectively be capable of being arranged at a greater distance from the build surface, for example in order to allow a coating arrangement described hereinbelow to pass along the build surface.

As explained above, the molding compound in a starting state can initially be generally liquid, pulverulent or granular and can comprise, for example, plastics, ceramics or metal materials and/or mixtures thereof. Furthermore, the molding compound can be designed to be selectively solidifiable in accordance with an irradiation explained hereinbelow, for example as a result of fusion or sintering or the selective and location-specific curing of liquid plastics material.

The device can further comprise, in a generally known manner, a coater arrangement which is configured to apply new molding compound to the build surface and in particular to finished workpiece layers which have already solidified. This as yet unprocessed molding compound can then again be irradiated in a subsequent step, in order to produce a further workpiece layer and thus gradually build up the workpiece layer by layer. A substantially cyclic sequence of application of a new raw material or molding compound layer and subsequent irradiation to produce a new uppermost workpiece layer can thus be achieved, whereupon a further raw material layer is again applied to the workpiece layer last produced, etc. An example of such a coater arrangement which is directed specifically to the cyclic application of molding compound in the form of a powder material is to be found in EP 2 818 305 A1.

The device further comprises an irradiation arrangement which is adapted to selectively irradiate the molding compound on the build surface with electromagnetic radiation in order to produce a workpiece by means of an additive layer manufacturing method. For this purpose, the molding compound can selectively be irradiated, as it were, location-dependently or location-specifically. The electromagnetic radiation can be laser radiation, which can further be designed to solidify the molding compound as a result of the irradiation. The irradiation arrangement can generally be arranged opposite the build surface, for example above it.

The irradiation arrangement comprises a plurality of irradiation units, wherein the irradiation units are adapted to irradiate a respective associated individual region of the build surface. The irradiation units can be individual units of the irradiation arrangement which are each designed to emit a beam and/or direct a beam at the build surface. For example, the irradiation units can each comprise one or more beam outlet regions from which an individual beam emerges from the irradiation arrangement into the surroundings in order to strike the build surface. Furthermore, a plurality of irradiation units can be connected to a common radiation source, for example by means of suitable light guides. Alternatively or in addition, the irradiation units can comprise their own radiation sources.

According to a variant it can accordingly be provided that at least selected irradiation units each comprise a light guide by means of which they are connected to a common laser beam source, as well as an optional passage control device for selectively determining whether a beam is actually emitted by the respective irradiation unit and directed at the build surface. For this purpose, the passage control device can comprise a suitable shutter unit.

It can likewise be provided that at least selected irradiation units comprise their own laser source. In order to permit a space-saving and dense arrangement of the beam outlet regions of the irradiation units opposite the build surface, the beam outlet regions can be connected by means of light guides to radiation sources of the irradiation units that are arranged further away within the device. It can likewise be provided, however, that the respective radiation sources are arranged substantially within or close to the respective radiation outlet regions of the irradiation units. According to a variant, the irradiation units comprise at least one VCSEL or surface emitter unit which can each comprise at least one laser beam-emitting diode or a laser beam-emitting semiconductor. A plurality of such units can also be combined on individual chips or modules and thus arranged in a space-saving manner within the device.

The number of irradiation units can be more than 10, more than 20, more than 50, more than 100, more than 500 or even more than 1000. The exact number can be chosen according to the desired manufacturing accuracy or build field size.

The individual regions of the build surface can be defined and associated with the irradiation units virtually, as it were. The individual regions can thereby reflect on the build surface an arrangement of the irradiation units in the irradiation arrangement. As explained below, the irradiation units can be arranged within the irradiation arrangement, for example, in the form of a matrix or lattice, so that the individual regions can correspondingly reproduce this arrangement on the build surface. In other words, the individual regions can thus define virtual matrices, grids, networks or lattices on the build surface. This is the case in particular when the individual regions of an associated irradiation unit are in each case substantially directly opposite one another. For this purpose, the individual regions can be arranged relative to a correspondingly associated irradiation unit substantially in such a manner that they can be connected by means of a linear beam path. In particular, the individual regions can be arranged substantially directly opposite a correspondingly associated irradiation unit so that they can be connected by means of a linear beam which runs, for example, substantially vertically and/or orthogonally to the build surface.

The exact position, size and/or any overlapping of the individual regions can further be flexibly defined, for example in accordance with a desired manufacturing accuracy, a beam profile or any relative movability of the irradiation arrangement and the build surface. As explained in greater detail below, the coverage, or degree of filling, of an individual region by a beam of the respective irradiation unit can be chosen differently.

In particular, substantially complete coverage of the individual regions, excess coverage or incomplete coverage can be provided. The cross-sectional area in particular at the point of impact can thereby correspond to about 100% of the area of the individual region (complete coverage), more than 100% (excess coverage) or less than 100% (incomplete coverage).

Finally, in order to achieve solidification that is as uniform and extensive as possible, overlapping irradiation can generally be provided, whereby build surface regions or individual regions can be irradiated by at least two irradiation units jointly. As discussed hereinbelow, the irradiation units can for this purpose also irradiate adjacent individual regions at the same time as a result of excess coverage and/or the individual regions are defined to overlap so that overlapping irradiation of the build surface can be achieved even when the coverage of the individual regions is merely complete or incomplete.

The association of individual regions and irradiation units can generally be fixed, for example as a result of the construction of the device and in particular the relative arrangement of the build surface and the irradiation arrangement determined by the construction. In other words, the corresponding association can be substantially unchangeable due to the device. Alternatively or in addition, possibilities for the flexible disposition of the relative arrangement of the build surface and the irradiation arrangement can be provided, for example in the form of mechanical or electromechanical adjusting mechanisms. In general, this can also include a variation, explained hereinbelow, of the association of individual regions and irradiation units during the process of producing a workpiece, for example because an irradiation unit can optionally also irradiate adjacent individual regions as a result of a corresponding relative adjustment.

It can further be provided that the individual regions are individually associated with only a single irradiation unit. In general, at least as many individual regions as there are irradiation units can thus be provided. At least immediately adjacent individual regions can further overlap at least slightly. The shape of the individual regions can further be substantially square, rectangular, triangular or circular.

The individual regions can further be generally of the same size. According to a variant, a single individual region comprises not more than about $1/10$ of the total area of the build surface. It is likewise conceivable that a single individual region comprises not more than about $1/100$, not more than about $1/250$, not more than about $1/500$, not more than about $1/750$ or not more than about $1/1000$ of the total area of the build surface.

The emitted beams of the irradiation units each have a cross-sectional area which corresponds to between about 2% and about 170% of the area of a respective associated individual region, for example between about 2% and about 100%. In a known manner, the beams can comprise a substantially round, or circular, cross-sectional profile, which gives the corresponding cross-sectional area. Furthermore, the cross-sectional area of the beam directly at the irradiation unit can be used as the basis, preferably, however, the cross-sectional area of the beam at the point of impact on the build surface, or on the respective associated individual region. The size of the individual regions, on the other hand, can be chosen within the framework of the mentioned limits, whereby the exact determination can take place, for example, according to the type of material processed or the desired manufacturing accuracy. Accordingly, it can also be provided that the cross-sectional areas of the beams exceed the area of a respective associated individual region, that is to say cover more than 100% of the area of the individual region.

This also means that an emitted beam can overlap with any adjacent individual regions, for example in order to permit particularly reliable extensive solidification. In this case, the individual region that is substantially completely covered (that is to say to the extent of about 100%) by the beam of a corresponding irradiation unit can be understood as actually being associated with an irradiation unit. Adjacent individual regions, on the other hand, on account of the overlapping mentioned above, can be covered at most in part (for example in each case to the extent of 10%). For the sake of completeness, it should be mentioned that, in order to achieve overlapping irradiation, it can likewise be provided to define the individual regions in such a manner that they overlap at least partially. If the areas of the individual regions are covered, for example, to the extent of about 100% by the respective associated beams, there is likewise overlapping irradiation.

By the definition of the proportion of the beam cross-sectional areas in the areas of the individual regions, the different coverage variants of the individual regions discussed above can be achieved (see complete, excess and incomplete coverage). In a variant, the arrangement of the irradiation units is reflected on the build surface by means of the individual regions, wherein the individual regions are arranged immediately adjacent to one another or spaced apart slightly from one another. As mentioned, the individual regions can, however, preferably overlap. If the beams of the irradiation units in such cases cover the areas of the individual regions completely to the extent of about 100%, substantially uniform extensive irradiation of the build surface takes place. However, the beams of the irradiation units can likewise cover the individual regions with a proportion of more than 100% and thus excessively, for example with a proportion of about 120%. Adjacent individual regions can thereby also be partially irradiated at the same time, so that the points or areas of impact of the beams on the build surface can likewise overlap at least slightly. In the above cases, extensive irradiation and solidification of the molding compound can further take place substantially by a single pulse, or shot, of irradiation.

Finally, the beams can also cover the individual regions only incompletely, that is to say with a proportion of less than 100%. Complete solidification of the molding compound in an individual region, which may be desired, can, however, still be achieved by heat conduction within the molding compound. Deflections of the beam are likewise conceivable in order to be able to direct it at all points within an individual region and completely solidify the molding compound enclosed thereby. This can take place by means of optical deflection devices, which can comprise, for example, adjusting lenses, scanner mirrors or the like. However, owing to the comparatively small size of the individual regions, only slight deflection or beam guiding movements can suffice for this purpose. A considerable improvement in efficiency is thus still achieved in comparison with the guiding of a single beam over the entire build surface.

The lower limit of the above range for the proportion of the cross-sectional area of the beam in the area of the individual region can likewise be about 5%, about 10%, about 20%, about 30%, about 40%, about 50%, about 60%, about 70%, about 80%, about 90%, about 100%, about 110%, about 120%, about 130%, about 140%, about 150%, about 160%. The upper limit, on the other hand, can be about 160%, 150%, about 140%, about 130%, about 120%, about 110%, about 100%, about 95%, about 90%, about 80%, about 70%, about 60%, about 50%, about 40%, about 30%, about 20%, about 10% or about 5%.

It will be appreciated that all possible combinations of the above upper and lower limits can also be provided, as long as the upper limit is above the lower limit, that is to say, for example, that the proportion of the beam cross-sectional area in the area of the individual region is between about 20% and about 70%, between about 40% and about 95%, between about 30% and about 90%, between about 50% and about 100%, between about 70% and about 100%, between about 80% and about 100%, etc.

It will be noted that, in known devices with scanner units, the diameter of an emitted laser beam is typically a few micrometers (for example 150 µm), but the build surface comprises several hundred square centimeters. Consequently, the above-mentioned proportions of the beam cross-sectional areas in the region to be irradiated are not achieved, because they are comparatively high. The inventors have accordingly recognized that, instead of providing individual irradiation units whose beam must be guided along the molding compound by means of a scanner device, it is possible to provide a plurality of irradiation units, each of which irradiates only predetermined individual regions of the build surface. The individual regions can thereby be chosen to be comparatively small, in order to divide the build surface, as it were, in the manner of a matrix into individual irradiation regions, or zones, wherein the individual regions preferably virtually reflect on the build surface an arrangement of the irradiation units within the irradiation arrangement. By activating the plurality of irradiation units at least partially in parallel and/or immediately one after the other, the individual regions can thus be irradiated in quick succession or even at the same time as one another, which can reduce the production time for an individual workpiece layer accordingly.

For example, this can make it possible that, in order to produce a linear workpiece edge, the beam of an individual irradiation unit no longer has to be moved by means of a scanner device completely along the molding compound according to the desired edge profile. Instead, this can be achieved by activating adjacent irradiation units from the plurality of irradiation units, which, or the associated individual regions of which, are arranged along the desired edge profile. In other words, the production of the desired workpiece edge can take place as it were "in one shot", if the corresponding irradiation units irradiate their respective individual regions at the same time.

A further development provides that the individual regions are so arranged that together they substantially continuously cover at least a portion of the build surface. As mentioned, the individual regions can for this purpose be chosen to be rectangular, for example, and can cover the build surface generally in the form of a matrix. The individual regions can further be immediately adjacent to one another and/or overlap at least slightly. In particular, it can be provided that the individual regions together cover at least about 50%, at least about 75%, at least about 90% or at least about 100% of the build surface.

It can further be provided that the irradiation units are each so configured that the beams are emitted at a substantially unchangeable angle. For example, the beams can be emitted substantially at an angle of from about 20° to about 160° relative to the irradiation arrangement and in particular at an angle of from about 60° to about 120°, from about 80° to about 100° or at an angle of about 90°. It can likewise be provided that the beams strike the build surface at a substantially unchangeable angle of from about 20° to about 160° and in particular at an angle of from about 60° to about 120°, from about 80° to about 100° or of about 90°.

Accordingly, it can thus be provided that the irradiation units, or also the irradiation arrangement as a whole, is free of scanner or other beam-deflecting devices, so that the construction is correspondingly simplified. Instead, it can be provided to provide the plurality of irradiation units (for example more than 50), which emit beams with a substantially unchangeable orientation and direct them at the build surface. The beams can thereby act on the molding compound, as it were, only at certain points, or stationarily. However, because of the large number of irradiation units, they can together still solidify connected regions of the molding compound in order to produce desired workpiece layers, in particular if the respective associated individual regions are chosen to be correspondingly small.

A further development provides that the irradiation units are arranged at predetermined distances relative to one another, and in particular at regular and/or equal distances relative to one another. The irradiation units can be arranged and spaced apart relative to one another analogously to the above-discussed variants of the individual regions and in particular can be located opposite the respective individual regions. In this connection, it can further be provided that the irradiation units are arranged in matrix, lattice or network form within the irradiation arrangement. The irradiation units can thereby form corresponding lattice, network or general overlapping points of the arrangement pattern. A corresponding arrangement of the irradiation units allows the build surface to be irradiated effectively and in particular extensively, in particular when larger connected areas of a workpiece layer which extend over a plurality of individual regions are to be irradiated.

The device can further comprise a control device which is configured to control the irradiation units according to a workpiece layer currently to be produced, in particular in such a manner that predetermined irradiation patterns are generated on the build surface. For example, the irradiation units can be activated only selectively by the control device at least in respect of the generation of a radiation intensity that is effective for solidification, according to which regions of the build surface, or molding compound, are currently to be solidified in order to produce a desired workpiece layer. For this purpose, the control device can in a manner known per se use CAD data and/or data derived therefrom of the workpiece to be produced and optionally also process that data further in order to generate the desired control commands. The irradiation pattern can thus correspond to a desired contour or shape of at least one region of the workpiece layer to be produced.

In this connection it can further be provided that the control device is configured to control the intensity of the radiation emitted by the irradiation units according to a workpiece layer currently to be produced. An intensity variation between either about 0% or about 100% of the maximum available radiation intensity of the irradiation units can in particular be provided, that is to say substantially a selective switching on and off of the irradiation units. It can likewise be provided that intermediate values between about 0% and about 100% of the maximum available radiation intensity can also be set, that is to say, for example, a variation of the radiation intensity in stages or steps and/or continuously.

It can further be provided that the control device is configured to control the intensity of the irradiation units in such a manner that only selected ones of the plurality of irradiation units generate radiation that is effective for solidification. Depending on the molding compound and/or irradiation unit used (or the radiation emitted thereby), it can be determined beforehand how many percent of the maximum available irradiation intensity are required to actually achieve a solidifying effect. Below that radiation intensity that is effective for solidification, on the other hand, the radiation can merely have a pre- or after-heating function, which may still be desirable, however, for reducing internal stresses, for example. Accordingly, it can be provided that only selected ones of the plurality of irradiation units are selectively activated by means of the control device so that they actually produce a workpiece layer having the desired contour from the molding compound. The further irradiation units, on the other hand, can simply remain in a non-activated state or have reduced radiation intensities so that they merely pre- or after-heat the molding compound. It will be appreciated that the choice of solidifying or merely pre-/ and after-heating irradiation units can vary flexibly according to the workpiece layer currently to be produced.

A further aspect provides that the control device is configured to control the irradiation units in such a manner that, for the production of a workpiece layer, the molding compound is irradiated substantially simultaneously in order to produce the workpiece layer substantially in a single step. For this purpose, as explained, those irradiation units whose associated individual regions coincide with the workpiece layer to be produced can selectively be chosen and activated, according to the shape, or contour, of the workpiece layer to be produced. If those irradiation units are activated substantially simultaneously, or if their intensities are simultaneously increased to generate a solidifying effect, the workpiece layer can be produced substantially "in one shot". A new molding compound layer can then be applied to the build surface and the workpiece layer just produced, in order to continue the production process immediately. The total production time of the workpiece can thereby be reduced accordingly, in particular compared with the prior-known case where individual or a small number of radiation sources, which are guided by a scanner, travel over the molding compound by means of individual irradiation vectors.

In addition or alternatively, the control device can be configured to control the irradiation units in such a manner that, in order to produce a workpiece layer, they irradiate the molding compound one after the other and/or in a plurality of steps. According to the desired manufacturing quality and/or the desired workpiece properties, it can also be provided that at least some workpiece layers are produced in a plurality of steps, or "shots".

In particular, the control device can be configured to control the irradiation units in such a manner that, in a first irradiation step, a first portion of a workpiece layer to be produced is formed from the molding compound and, in a second irradiation step, a second portion of the workpiece layer to be produced is formed from the molding compound. The first and second portions, in combined form, can form substantially the entire workpiece layer to be produced. Likewise, still further portions can be provided, which are produced in further separate irradiation steps. The portions can be arranged substantially adjacent to one another and/or can overlap slightly. In a variant, it is provided that the first and second portions are chosen in checkerboard form and in combined form together cover at least one region of the workpiece layer to be produced.

An advantage of this variant is the reduced size of the individual areas heated or even melted in one step, which can be advantageous in terms of the achievable manufacturing quality and the avoidance of internal stresses. In particular, the portions of the workpiece layer produced in individual irradiation steps can be so chosen that extensive connected molten regions of the molding compound are avoided. This can also be referred to as avoiding the formation of a molten sea.

A further variant provides that the control device is configured to control the irradiation units in such a manner that, in order to produce a workpiece layer, at least one irradiation vector is generated on the molding compound. The irradiation vectors can in known manner relate to irradiation profiles of a beam at or on the surface of the molding compound. These are also referred to as scan vectors, at least when the beam of an individual irradiation unit is deflected by a corresponding deflecting device and guided along the surface of the molding compound. According to the present variant, however, it can in particular be provided that, for example, immediately adjacent irradiation units are activated one after the other or with a time delay relative to one another, so that their individual point-like irradiation of the molding compound combines overall to form an irradiation vector at the molding compound surface. The control device can thus activate the irradiation units in such a manner that an irradiation or scan vector is, as it were, reproduced on the molding compound by the individual points of impact of the beams of the irradiation units. The irradiation vector can further be of generally linear form. Outer edges, for example, of the workpiece can be formed thereby.

The irradiation units can further be arranged substantially stationarily within the irradiation arrangement and, optionally, substantially unmovable parallel to the build surface. In this case too, the irradiation units can generally be free of scanner or deflection devices. Instead, they can be arranged substantially fixedly relative to the build surface and, optionally, direct beams at the build surface at an unchangeable angle. As before, however, it can be provided that the build surface is movable relative to the irradiation arrangement, for example in order to compensate for the increasing build size of the workpiece to be produced. This can take place along a movement axis which runs, for example, substantially orthogonally to the build surface and/or the irradiation arrangement. In particular, the movement axis can run generally vertically. Accordingly, it can thus be provided that the irradiation units, when viewed along the movement axis, are likewise movable relative to the build surface. According to the above variant, however, the irradiation units can be unmovable parallel to the build surface, that is to say do not perform any separate movements, and in particular do not perform any movements relative to the build surface, within a virtual plane which runs parallel to the build surface and/or orthogonally to the movement axis.

It can likewise be provided that the irradiation units each comprise a radiation source. This can be an independent and/or single radiation source of the irradiation units. Alternatively or in addition, the emitted radiation of at least some of the irradiation units can be concentrated by means of an additional optics unit to form a common beam. The latter variant can be advantageous in particular for increasing the total radiation intensity, for example when the individual irradiation sources taken by themselves do not have sufficient radiation intensity for melting or solidifying. The optics unit can generally be in the form of a micro-optics unit. The optics unit can further be formed separately from the irradiation units and be interposed in the beam path between the irradiation arrangement and the build surface. The optics unit can further comprise at least one optical lens or diffractive optical elements for concentrating the plurality of individually emitted beams into a common beam, for example in the form of suitable collecting lenses. In addition, adjustable lenses can be provided in order to adapt the orientation of the concentrated beam in a desired manner, that is to say, for example, in order to displace its point of impact on the build surface in a desired manner.

In this connection it can further be provided that, for example, between 2 or 10, between 4 or 20 or between 10 or 60 irradiation units are combined into a group which interacts by means of the optics unit in such a manner that the emitted radiation of the individual irradiation units is concentrated in the manner described above. In particular, the optics unit can thus comprise for each corresponding group of irradiation units a separate lens for concentrating and/or an adjustable lens according to the above variants. In particular, a plurality or all of the irradiation units of the irradiation arrangement can be combined into a plurality of corresponding groups, wherein the groups can each comprise an equal number of irradiation units.

Finally, it can also be provided that the association of individual regions and irradiation units is variable during the process of producing a workpiece. In particular, it can be provided that such a variation takes place during the production of an individual workpiece layer and/or between separately produced workpiece layers, for example between immediately successive workpiece layers. Such a variation can take place with an above-mentioned change of the relative arrangement of the irradiation arrangement (or at least of individual irradiation units thereof) and the build surface. It is likewise conceivable to arrange an optics unit and/or deflection device in the beam path between the irradiation arrangement and the build surface. The optics unit or deflection device Ia can further be adapted to direct the beams emitted by the irradiation arrangement at predetermined individual regions of the build surface and in particular to flexibly vary this orientation. This can be accompanied by a corresponding variation in the association of individual regions and the irradiation units of the irradiation arrangement. The irradiation arrangement can thereby further remain substantially stationary.

Alternatively or in addition, the irradiation arrangement itself (or at least individual irradiation units thereof) can be movable relative and in particular parallel to the build surface, so that the beams emitted by the irradiation units can be directed at changing individual regions as a result of the displacement. This can be accompanied by a corresponding variation of the association of individual regions and irradiation units.

The invention relates further to a method for producing three-dimensional workpieces by means of a device which comprises the following:

a build surface which is adapted to receive a molding compound; and an irradiation arrangement which is adapted to selectively irradiate the molding compound on the build surface with electromagnetic radiation, in order to produce a workpiece by means of an additive layer manufacturing method;

wherein the irradiation arrangement comprises a plurality of irradiation units which are adapted to irradiate a respective associated individual region of the build surface, and wherein the method comprises the following steps:

emitting a beam by at least selected ones of the plurality of irradiation units onto a respective individual region associated with the irradiation units, wherein the cross-sectional area of the emitted beams in each case corresponds to between about 2% and about 170% of the area of the respective associated individual region.

It can generally be provided that the device by means of which the method is carried out is configured according to any of the aspects discussed above. Furthermore, the method can comprise any step for carrying out and providing the above-described operating states and/or actions of the device. Likewise, in the further method steps discussed hereinbelow, it can be provided that the features thereof can be further developed based on the above embodiments.

Specifically, it can be provided that the method further comprises the following step: emitting beams by at least selected ones of the plurality of irradiation units at a substantially unchangeable angle over a plurality of workpiece layers to be produced. The plurality of workpiece layers to be produced can be successive workpiece layers. Likewise, the plurality can generally comprise more than 10, more than 50 or more than 100 workpiece layers. It can further be provided that the beams are emitted at the same unchangeable angle for any workpiece layer to be produced.

It can further be provided that the method further comprises the following step: controlling the irradiation units according to a workpiece layer currently to be produced, in particular in such a manner that predetermined irradiation patterns are generated on the build surface.

The following step can likewise be provided: controlling the intensity of the radiation emitted by the irradiation units according to the workpiece layer currently to be produced.

In this connection it can further be provided that the control of the intensity of the irradiation units takes place in such a manner that only selected ones of the plurality of irradiation units generate radiation effective for solidification.

Control of the irradiation units can likewise take place in such a manner that, for the production of a workpiece layer, the molding compound is irradiated substantially simultaneously in order to produce the workpiece layer substantially in a single step.

Furthermore, the control of the irradiation units can take place in such a manner that, in order to produce a workpiece layer, they irradiate the molding compound one after the other and/or in a plurality of steps.

According to a further aspect, the control of the irradiation units can take place in such a manner that, in a first irradiation step, a first portion of a workpiece layer to be produced is formed from the molding compound and, in a second irradiation step, a second portion of the workpiece layer to be produced is formed from the molding compound.

Finally, the control of the irradiation units can take place in such a manner that, in order to produce a workpiece layer, at least one irradiation vector is generated or reproduced on the molding compound. It will be appreciated that the variants of the control of the irradiation units discussed in connection with the device likewise relate to the above-described method steps.

According to a further development, the method can further comprise the following step: varying the association of individual regions and irradiation units during the process of producing a workpiece.

A further aspect relates to a further development of the devices and of the method according to the above embodiments for improving protective gas feeding. For this purpose, it can be provided to provide a protective gas flow along the processing units, which can be effected via fluid conducting regions in particular in the edge regions of the irradiation arrangement.

The fluid conducting regions can comprise, for example, diaphragms, pipes or other suitable gas feeding elements. At least one fluid conducting region can be in the form of a protective gas supply region and at least another fluid conducting region can be in the form of a protective gas discharge region, whereby a protective gas flow can be generated between those regions by means of the above-mentioned gas feeding elements. The protective gas flow can accordingly be effected as a substantially free and preferably linear flow along a region of the irradiation arrangement in which the irradiation units are arranged. That region can be, for example, an underside of the irradiation arrangement which directly faces the build surface. In general, the protective gas can further be cooled in order, for example, to limit heating of the irradiation units as a result of back-reflection through the build surface. Likewise, the protective gas flow can serve to remove weld smoke. Furthermore, the protective gas flow can be provided substantially at the same time as the production of a workpiece layer and also beyond.

In this connection, it can further be provided that the irradiation units are divided into individual groups or modules which each comprise their own gas feeding elements and/or fluid conducting regions in order to achieve an individual protective gas flow along the respective irradiation units for each module. For example, adjacent modules can be separated from one another by corresponding diaphragms, so that the protective gas flow does not pass from one module to the next. It can also be provided to adapt a cooling of the protective gas individually for each module, for example in dependence on an activation state and/or an energy input into the molding compound by means of the respective irradiation units which is expected or has already taken place.

As mentioned, it can be provided, superordinately, that the device and the method allow the molding compound to be irradiated by means of the irradiation units of the irradiation arrangement in a manner that is effective for solidification. In particular, it can be provided that the production of the workpiece is possible solely by means of the corresponding irradiation units without having to use additional or external irradiation units. However, it is likewise conceivable in principle that the irradiation units are provided merely as pre- and/or after-heating units and that additional or external irradiation units are provided for the actual solidification of the molding compound, for example in the form of known laser sources and scanner units. By means of the above-discussed arrangement and control of the irradiation units it is still possible in this case too to achieve a significant increase in the production efficiency, for example because individual preheating irradiation patterns can be generated on the molding compound beforehand. Further irradiation units are then able to travel over the preheated regions more quickly because of the energy input that has already taken place, in order to achieve a currently desired solidification. A further advantage of such preheating is that the powder can be heated until shortly before the phase transition and then melted or solidified by means of a small power-enhancing pulse. Controlled melting can thereby be achieved.

Finally, the invention relates to the use of a device according to any one of the preceding aspects for producing a three-dimensional workpiece by means of an additive layer manufacturing method. This is to be understood as meaning in particular such a use in which the molding compound is irradiated in a manner that is effective for solidification by means of the irradiation units of the device.

Preferred embodiments of the invention will be discussed hereinbelow with reference to the accompanying figures, in which:

FIGS. 1A-1D show a cyclic sequence for producing a workpiece layer by means of a device according to a first exemplary embodiment;

FIG. 1E is a view of an underside of an irradiation arrangement according to the first exemplary embodiment;

FIGS. 2A-2C show examples of irradiation patterns for producing a workpiece layer by means of the device according to the first exemplary embodiment;

Figure 5:
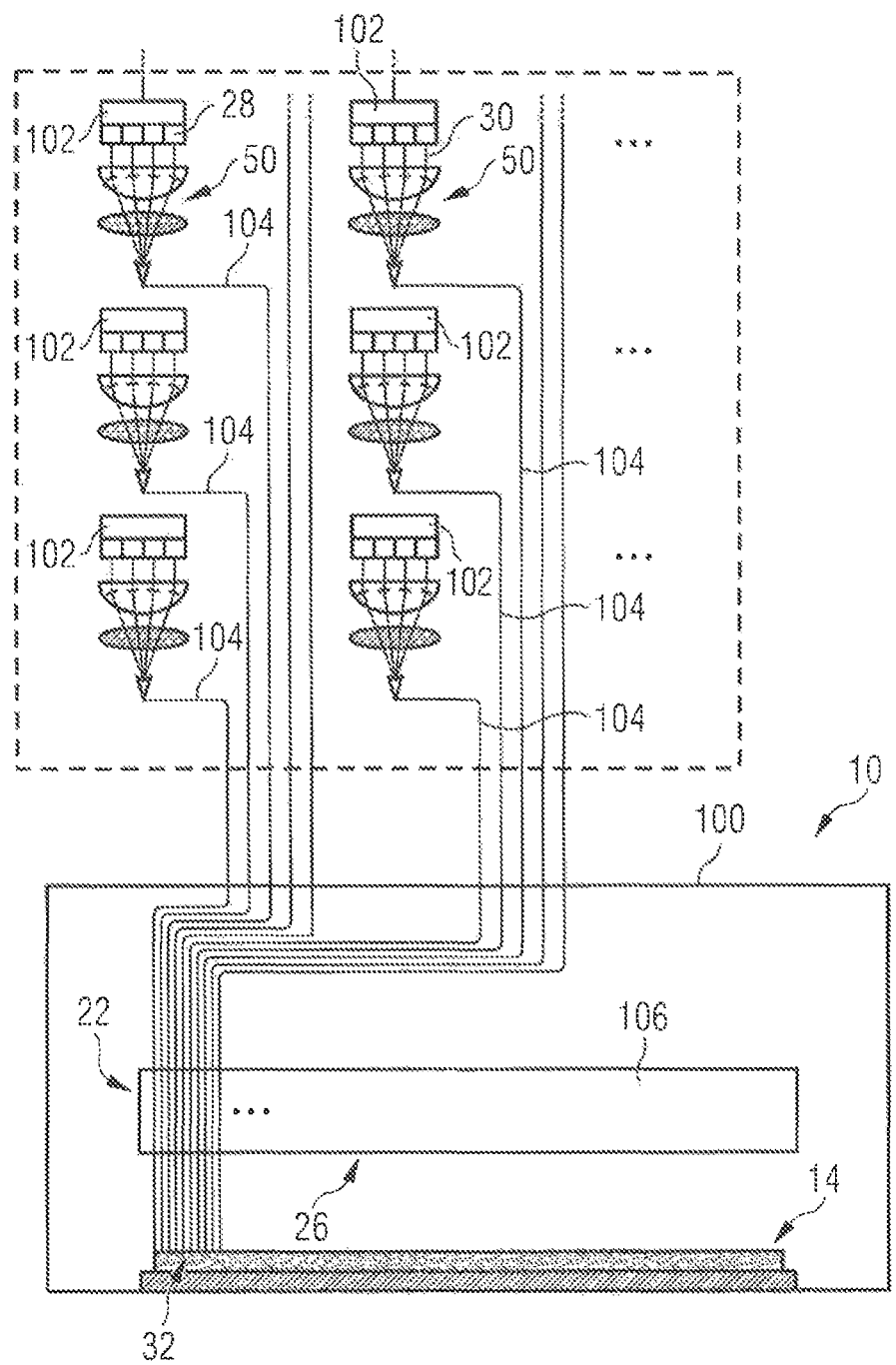

FIG. 5 shows a device according to a fifth exemplary embodiment, in which the radiation sources of the irradiation units are arranged in remote regions of the device and wherein concentration of the emitted rays is also shown; and FIGS. 6A-6B show a device according to a sixth and seventh exemplary embodiment, wherein the beams emitted by the irradiation arrangement can be associated with variable individual regions.

FIGS. 1A-1D show a device 10 according to a first exemplary embodiment. The device 10 comprises a build surface 14 which is formed on a fixed carrier 16. In FIG. 1A it will be seen that a layer of a molding compound 18 to be solidified, which in the present case comprises a powder material, has already been applied to the build surface 14. A coater device 20 known per se is provided for that purpose, which coater device is arranged in FIG. 1A close to a left end region 23 of the carrier 16 and thus outside the build surface 14 which can actually be used for producing a workpiece. The coater device 20 applies new layers of the pulverulent molding compound 18 to the carrier 16 cyclically in a manner known per se in order thus to produce a workpiece by means of an additive layer manufacturing method.

For the layer-wise solidification of the molding composition 18 there is further provided an irradiation arrangement 22 which is arranged above and thus opposite the build surface 14. The irradiation arrangement 22 is movable according to arrow P relative to the build surface 14 along a vertical movement axis. The irradiation arrangement 22 further comprises at each of its outer edge regions in FIG. 1A a fluid conducting region 24 for generating a protective gas flow S (see FIG. 1B) along an underside 26 of the irradiation arrangement 22 facing the build surface 14.

It will further be seen in FIG. 1A that the irradiation arrangement 22 has on its underside 26 a plurality of irradiation units 28, only some of these irradiation units 28 being provided with a corresponding reference numeral for reasons of clarity. The irradiation units 28 are generally arranged immediately adjacent to one another and at regular intervals relative to one another. In particular, it is also provided in a vertical direction to the plane of the drawing of FIG. 1A that, for each individual irradiation unit 28, a row of further irradiation units 28 is arranged. The irradiation units 28 accordingly form a grid in matrix form or, in other words, a network or lattice in matrix form on the underside 26 of the irradiation arrangement 22.

This is further clear from the view of FIG. 1E, which is a plan view of the underside 26 of the irradiation arrangement 22. The viewing axis thereby runs in the opposite direction to the arrow P of FIG. 1A. The above-described grid, or network, in matrix form of irradiation units 28 on the underside 26 as well as the fluid conducting regions 24 on both sides in the corresponding edge regions of the irradiation arrangement 22 can be seen. In this representation, again only selected irradiation units 28 have been provided with a corresponding reference numeral. Likewise, the number of irradiation units 28 does not correspond exactly to the representation according to FIGS. 1A-D. Furthermore, the irradiation units 28 are shown generally rectangular in shape but can also have different shapes and, for example, can be round or circular.

In the present case, the irradiation units 28 each form a beam outlet region of the irradiation arrangement 22 for emitting a single beam 30 per irradiation unit 28 and directing it at the build surface 14 (see the following discussion of FIG. 1B). For this purpose, each of the irradiation units 28 comprises its own laser radiation source.

However, as discussed above, it is also conceivable that the irradiation units 28 are connected by means of light guides to radiation sources arranged remotely.

Returning to FIGS. 1A-B, it will be seen that the irradiation arrangement 22 is moved in a first step according to arrow P in the direction towards the build surface 14. This serves to reduce the distance between the irradiation arrangement 22 and the build surface 14 in order to increase the energy input into the molding compound 18 by means of the irradiation units 28. A corresponding end position of the irradiation arrangement 22 is shown in FIG. 1B.

It is further clear from FIG. 1B that a protective gas flow according to arrows S is generated via the fluid conducting regions 24 at both sides. The protective gas flow runs along the underside 26 of the irradiation arrangement 22 from the left to the right fluid conducting region 24 in FIG. 1B. Accordingly, the fluid conducting region 24 on the left in FIG. 1B serves as a protective gas supply region and the fluid conducting region 24 on the right serves as a protective gas discharge region. The two fluid conducting regions 24 can further be connected to a line system, not shown, in order to produce a protective gas loop between the fluid conducting regions 24. The protective gas can thereby also be cooled, in order to reduce the temperature of the irradiation units 28, which can increase undesirably as a result of back-reflection of the emitted radiation through the build surface 14.

It will further be seen in FIG. 1B that only selected ones of the plurality of irradiation units 28 emit a single beam 30, which strikes the uppermost layer of the molding compound 18 on the build surface 14 (see also FIG. 1A). Again, only selected ones of the plurality of emitted beams 30 are provided with a corresponding reference numeral. The beams 30 are rectilinear and directed vertically downwards and thus strike the build surface 14 after the smallest possible distance, so that a defined energy input is made possible. In particular, the beams 30 each run at an angle of about 90° relative to a plane of the irradiation arrangement 22, or to the underside 26 thereof, and likewise strike the build surface 14 at an angle of about 90° relative thereto (or at an angle of about 90° relative to an uppermost layer of the molding compound 18).

This angle of impact, or emission, is generally unchangeable, so that the irradiation units 28 each irradiate fixed and individually associated individual regions 32 of the build surface 14 which are located directly opposite them when seen along a vertical axis. This is clear from the region X in FIG. 1B bordered by a broken line, which shows the irradiation by an individual irradiation unit 28 of an individual region 32 of the build surface 14 located directly opposite.

As will be explained in greater detail below, the individual regions 32 of the build surface 14 accordingly define a virtual division of the build surface which corresponds to the arrangement of the irradiation units 28 in matrix form on the underside 26 of the irradiation arrangement 22. In other words, the build surface 14 is divided virtually by the individual regions 32 into individual irradiation zones analogously to the grid in matrix form of FIG. 1E, which individual irradiation zones can each be irradiated by a corresponding opposite irradiation unit 28.

It is not shown in greater detail in the figures that the generally circular cross-sectional profile of the beams 30 defines an area which corresponds to about 100% of the area of an individual region 32, the size of the beam cross-sectional area at the point of impact on the build surface 14 being considered. This is sufficient to solidify all the molding compound material within an individual region 32, in particular when irradiation takes place with a sufficient intensity and duration. In particular, the molding compound 18 in adjacent individual regions 32 can thereby be solidified to form a connected workpiece layer. This is clear, for example, from region Z in FIG. 1B, in which two adjacent individual regions 32 are simultaneously irradiated by two individually associated irradiation units 28. Consequently, the molding compound enclosed by the individual regions 32 joins to form a connected solidified region of the workpiece layer to be produced.

In summary, it is apparent from FIG. 1B that, in order to solidify the molding compound 18 to produce a specific individual workpiece layer, only some of the plurality of irradiation units 28 are selectively chosen to direct a corresponding beam 30 at the predetermined and fixedly associated individual regions 32 of the build surface 14. The workpiece-layer-individual irradiation pattern shown in FIG. 1B can thus be generated, in which only the regions with dark shading of the molding compound 18 are selectively solidified, but not the remaining regions with light shading. By activating the irradiation units 28 substantially simultaneously, the entire workpiece layer can thus be produced in a single step, or shot, which reduces the production time for each layer considerably.

The choice of suitable irradiation units 28 for each workpiece layer is made by means of a control device, which is not shown in greater detail. The control device identifies in a known manner, on the basis of CAD or other suitable workpiece data, the regions of the molding compound 18 that are to be irradiated for each workpiece layer currently to be produced. The control device further determines which individual regions 32 coincide with the regions of the molding compound 18 that are correspondingly to be irradiated and which irradiation units 28 are associated with each of those individual regions 32. Those determined irradiation units 28 are then each activated in order to emit a beam 30 and solidify the molding composition in their corresponding associated individual regions 32 location-specifically.

FIG. 1C shows a state in which the production of an individual workpiece layer is complete. The protective gas flow S is initially maintained for a certain period of time, in particular in order to ensure sufficient cooling of the irradiation units 28 and also reliable weld smoke removal. The irradiation arrangement 22 is then moved vertically upwards and away from the build surface 14, according to arrow A, and positioned in its starting position according to FIG. 1A above the build surface 14. This means that a sufficient gap or distance V (see FIG. 1D) between the irradiation arrangement 22 and the build surface 14 is produced, so that the coater arrangement 20 can be moved out of the position close to the left end region 23 of the carrier 16 in FIGS. 1A-D along the build surface 14 in order to apply a new layer of molding compound 18.

As is shown in FIG. 1D, the coater arrangement 20 then reaches a position close to the right end region 23 of the carrier 16. Furthermore, a new, shapeless powder layer, shown by light shading, has been applied, which powder layer also covers the individual regions 32 with dark shading selectively solidified according to FIG. 18. This powder layer can subsequently again be selectively solidified. FIGS. 2A-C show examples of individual irradiation patterns and steps for producing a workpiece layer. In FIGS. 2A-C, the contour 40 of a workpiece layer to be produced is shown on the build surface 14, which is indicated only schematically. The viewing axis corresponds to arrow P from FIG. 1A onto the build surface 14.

It will be seen in FIG. 2A that the workpiece layer bordered by the contour 40 is first divided into two portions 42, 44, which are depicted by different hatching and each comprise a plurality of individual rectangular regions of the build surface 14. For reasons of the representation, again only some regions of the portions 42, 44 have been provided with a corresponding reference numeral. It will be seen that the portions 42, 44 are arranged substantially in checkerboard form relative to one another. For the production of the workpiece layer it is provided that, in a first step, firstly only the individual regions according to portion 42 are irradiated by the corresponding irradiation units 28 located opposite them. This is again carried out by means of the control device, not shown, which determines those individual regions 32 that are covered by the corresponding portion 42, as well as the associated irradiation units 28. In a second step, the regions according to the second portion 44 are then irradiated. The arrangement in checkerboard form, and also the irradiation in two separate steps, makes it possible that only reduced portions, or areas, of a workpiece layer 40 are solidified in the respective steps. This can be advantageous for avoiding production faults, such as, for example, internal stresses in the workpiece, or the production of extensive connected regions of molten material (so-called molten seas).

It will be appreciated that the portions 42, 44 can also be chosen and arranged relative to one another so that they cover the entire the workpiece layer 44 bordered by the contour 40. Likewise, additional portions can be provided for closing the gaps between the portions 42, 44 and with the contour 40.

FIG. 2B again shows the contour 40 which surrounds a workpiece layer currently to be produced. This is divided by means of a virtual grid, which defines individual cells 46. These cells 46 are each to be irradiated individually in order to achieve desired workpiece properties, namely by means of the individual scan vectors S2 shown in FIG. 2B. The scan vectors S2 each travel linearly over an individual cell 46 in a manner known per se in order to solidify the molding compound 18 contained therein.

As indicated in FIG. 1E, such scan or irradiation vectors S2 can also be generated by means of the present irradiation arrangement 22. For this purpose, the control device determines those individual regions 32 through which there runs an irradiation vector S2 to be generated, and then also the irradiation units 28 associated with the respective individual regions 32. These irradiation units 28 are then activated immediately one after the other or with a slight time delay or, in other words, in waves, in order to generate the desired irradiation pattern according to the vectors S2 on the molding compound 18.

In FIG. 1E it is shown merely by way of example that three immediately adjacent and directly adjoining irradiation units 28 can be activated temporally one after the other in order to generate the indicated irradiation vector S2. For this purpose, there is activated first the irradiation unit 28 positioned furthest on the left, along which the irradiation vector S2 extends, and immediately thereafter the middle irradiation unit and finally the irradiation unit 28 positioned furthest on the right.

It will be appreciated that the individual irradiation vectors S2 shown in FIG. 2B can also be generated at the same time and that analogous irradiation vectors S2 can subsequently be generated in further individual cells 46, until finally the entire region enclosed by the contour 40 has been irradiated and solidified.

FIG. 2C further shows a possibility for forming the contour 40 itself and thus an outer edge region of the workpiece layer. For this purpose, individual irradiation vectors S2 are defined which extend with a substantially identical length along the contour 40. There are then again determined those individual regions 32 through which a corresponding irradiation vector S2 passes, as well as the respective associated irradiation units 28. These can then be activated one after the other in the manner described above in order to generate the irradiation vectors S2 on the build surface 14.

In particular, it can be provided that all the irradiation vectors S2 in FIG. 2C are generated substantially simultaneously. This simultaneous generation with a reduced length of the irradiation vectors S2 makes it possible to produce the entire edge along the contour 40 in an extremely short time. In other words, the plurality of irradiation units 28 allows the contour to be travelled in parallel or simultaneously in pieces, so that the total processing time is reduced. This is the case in particular compared with solutions in which the beam of a single radiation source must travel the entire contour 40 completely.

Figure 3:
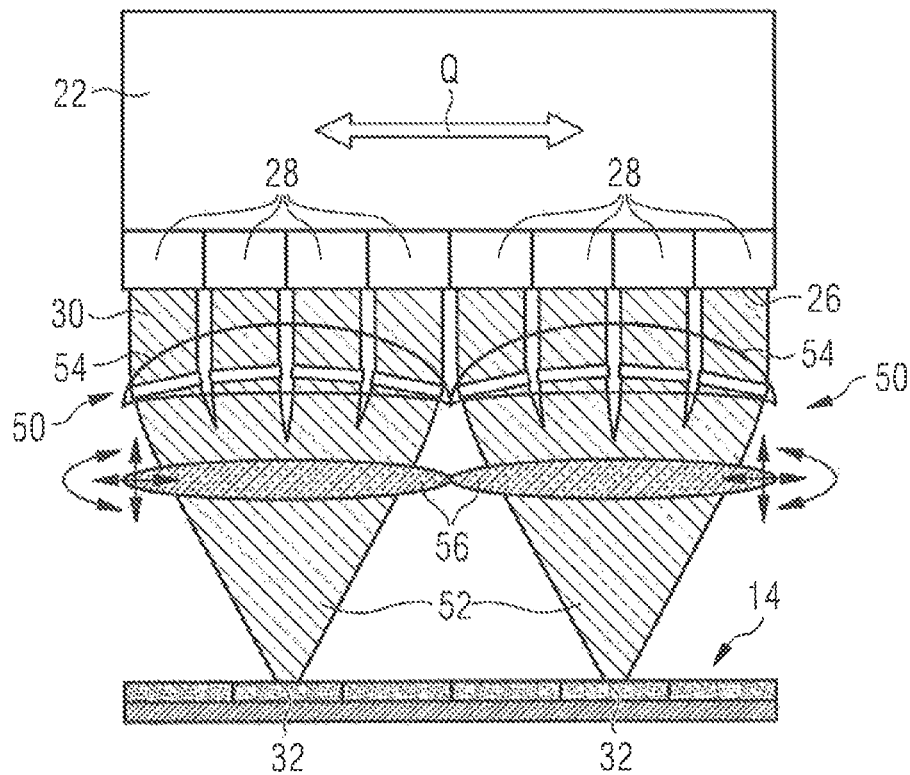
FIG. 3 shows a device according to a second exemplary embodiment, in which an optics unit is additionally provided between the irradiation arrangement and the build surface.

FIG. 3 shows, schematically, an irradiation arrangement 22 according to a further embodiment. It will be seen that the irradiation arrangement 22 again comprises a plurality of irradiation units 28 on its underside 26 facing the build surface 14. These in turn each generate a rectilinear beam 30 running perpendicularly to the build surface 14, which beam emerges from the irradiation units 28 at an unchangeable angle. In order to increase the radiation intensity, the beams 30 from a plurality of individual irradiation units 28 are combined by means of an optics unit 50 into a single enhanced beam 52. In the case shown, four by four irradiation units 28 are combined into a single group.

In the view of FIG. 3, only an outermost row of four irradiation units 28 is shown, and the further irradiation units 28 are displaced into the plane of the drawing. Furthermore, a collecting lens 54 is shown for each group of four by four irradiation units 28, which collecting lens concentrates the individual beams 30 to form the enhanced beam 52. For each group of four by four irradiation units 28, the optics unit 50 further comprises a displacement lens 56, which is able to adjust the focus position, or point of impact, of the enhanced beam 52 on the molding compound 18 according to the axes shown in FIG. 3. The enhanced beam 52 (and thus a correspondingly combined group of four by four irradiation units 28) can accordingly again be associated with a predetermined individual region 32 of the build surface 14. Furthermore, the irradiation arrangement 22 can be movable as a whole parallel to the build surface 14 according to arrow Q, so that an enhanced beam 52 can also flexibly be associated with other individual regions 32 of the build surface 14.

It will further be seen that neither the individual beams of the irradiation units 28 nor the enhanced beam 52 completely cover the respective associated individual region 32. In other words, the corresponding beam cross-sectional areas fill the area of an associated individual region 32 to the extent of less than 100% and more precisely only to the extent of about 30%. Complete solidification of the molding compound in a respective individual region 32 can nevertheless be achieved by varying the point of impact of the beam by means of the displacement lens 56, so that it can be directed at all the points within an individual region.

It will be appreciated that the number of irradiation units 28 shown in FIG. 3 is merely by way of example, and that a significantly higher number of irradiation units 28 can be provided in total, which can again be arranged in a grid in matrix form analogously to FIG. 1E.

Figure 3A:
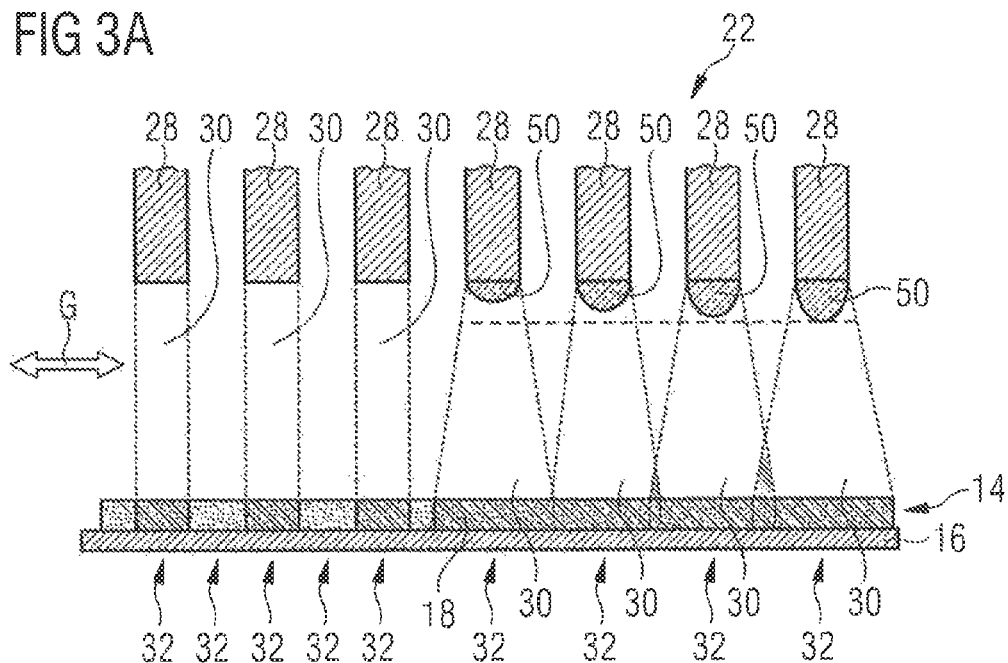
FIG. 3A shows a device according to a third exemplary embodiment, in particular in order to show possibilities for beam expansion of individual irradiation units as well as possible associations with individual regions.

FIG. 3A shows a further exemplary embodiment for explaining possibilities for expanding the beams of individual irradiation units 28 as well as covering individual regions 32. There will again be seen the carrier 16, which defines the position of the build surface 14, as well as a molding compound layer 18 arranged thereon. The irradiation units 28 each emit a beam 30, which is directed at an opposite individual region 32 of the build surface 14. Merely by way of example, it is thereby shown that the beams 30 of the irradiation units 28 are expanded to different extents. Generally, it can instead be provided that, in the case of a plurality of irradiation units 28, each of the irradiation units 28 emits a beam according to only one of the examples shown in FIG. 3A, that is to say beam expansion is uniform within the irradiation arrangement 22 as a whole.

Specifically, it is provided in the case of the three irradiation units 28 on the left in FIG. 3A that they cover an opposite individual region 32 at the point of impact substantially completely to the extent of 100%. A plurality of individual regions 32 is thereby shown, not all of which are irradiated, however. For example, between the first two irradiated individual regions 32 in FIG. 3A (left-hand half) there is arranged an individual region 32 that is currently not irradiated. However, in order to be able to irradiate the build surface 14 completely, the irradiation arrangement 22 can be displaced parallel to the build surface 14 according to arrow G. As a result, the irradiation units 28 are also able to irradiate the further individual regions 32 which in the state shown form unirradiated gaps.

The four irradiation units 28 on the right in FIG. 3A each have optics units 50 in the form of microlenses, in order to expand the emitted beams 30 to different extents. However, it can again be provided that all the irradiation units 28 within the irradiation arrangement 22 also have microlenses 50 of the same type and thus emit beams 30 that are expanded in the same manner. In this case too, it is provided that the emitted beams 30 cover respective associated individual regions 32 at the point of impact substantially completely to the extent of 100%. However, the individual regions 32 in this case are arranged to overlap, which is clear in particular from the irradiation units 28 arranged furthest on the right in FIG. 3A. As a result of this overlapping, reliable extensive solidification of the molding compound 18 can be achieved because, for example, the two individual regions 32 on the right in FIG. 3A are each irradiated by two of the irradiation units 28.

As discussed above, it is, however, also conceivable to arrange the individual regions 32 so that they are merely adjacent to one another and do not overlap, and to provide excess beam coverage of the respective individual regions 32 of more than 100% at the point of impact (for example a ratio of 150% of the incident beam areas to the respective areas of the individual regions 32). This variant is not shown separately in FIG. 3A. The corresponding virtual division of the build surface 14 into the individual regions 32 would, however, be comparable to the matrix pattern of the irradiation units 28 shown in FIG. 1E. In this case too, because of the increased or excess coverage, overlapping irradiation of the build surface 14 and therefore reliable solidification of the molding compound 18 can be achieved. It will be appreciated that, superordinately, mixed forms of these two variants are also conceivable (that is to say both an at least partially overlapping arrangement of the individual regions 32 and irradiation with a coverage of more than 100%).

Figure 4:
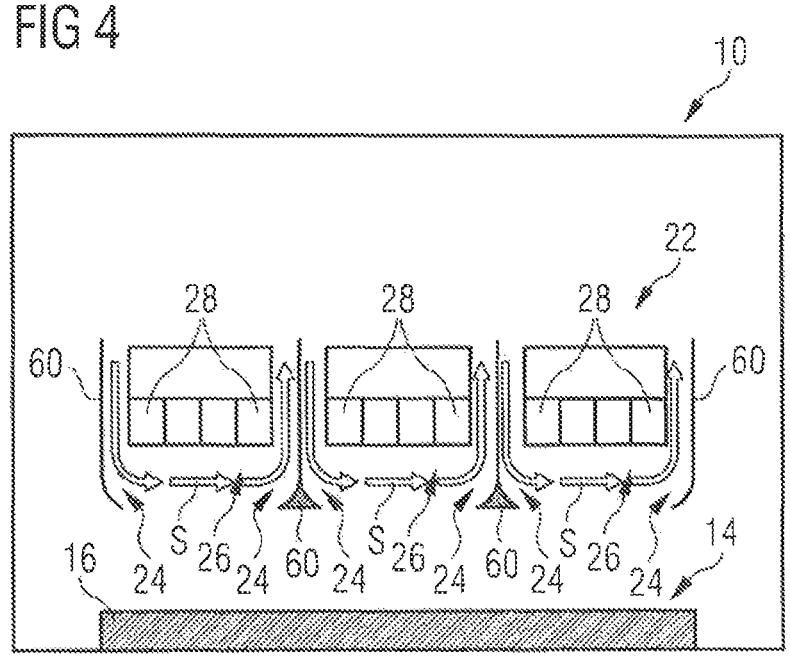
FIG. 4 shows a device according to a fourth exemplary embodiment, which shows a further example of protective gas feeding along the irradiation arrangement of the device.

FIG. 4 shows a further embodiment of the device 10 which relates to a further variant for feeding protective gas along the irradiation arrangement 22. FIG. 4 again shows the carrier 16 and the build surface 14, which are located opposite the underside 26 of the irradiation arrangement 22. The irradiation arrangement 22 again comprises a plurality of irradiation units 28. However, the irradiation units are combined into individual groups or modules, each module in the present case comprising a square arrangement of four by four irradiation units 28. In the view of FIG. 4, only an outermost row of four irradiation units 28 is shown per module, and the further irradiation units 28 are displaced into the plane of the drawing.

It will further be seen in FIG. 4 that two fluid conducting regions 24 are provided for each individual module of irradiation units 28, which fluid conducting regions are defined by diaphragms 60. The fluid conducting regions 24 on the left serve as a protective gas supply region and the fluid conducting regions 24 on the right serve as a protective gas discharge region. It will be seen that the diaphragms 60 are each so constructed that they guide the inflowing protective gas for each module according to arrow S from the protective gas supply region to the protective gas discharge region, a protective gas flow S being established along the underside 26 of the respective modules of irradiation units 28. Owing to the shorter flow path of the protective gas flow S, particularly effective cooling of the irradiation units 28 can thus be achieved. Furthermore, the cooling can be adjusted individually for each module, for example in dependence on an activation and/or an energy input by means of the modules into the molding compound 18 which is expected or has already taken place. The latter can again be determined, for example, by means of the control unit from the data of the workpiece to be produced.

FIG. 5 shows an example of the arrangement of the radiation sources of the irradiation arrangement 22 in a remote region of the device 10 and in particular outside a process chamber 100. Specifically, a plurality of radiation sources 102 is shown, each of which comprises, analogously to the example of FIG. 3, a group of four by four irradiation units 28. The individual emitted beams 30 of the groups of radiation sources 102 are concentrated via optics units 50 analogously to the embodiment according to FIG. 3 and guided into associated light guides 104. The light guides 104 extend into the process chamber 100 and in particular into a base body 106 of the irradiation arrangement 22 located opposite the build surface 14. On the underside 26 of the base body 106, the light guides 104 are again arranged in matrix form analogously to FIG. 1E, so that the concentrated beams 30 of the individual irradiation units 28 are again associated with corresponding individual regions 32 of the build surface 14.

FIGS. 6A-B show possibilities for varying an association between the individual regions 32 of the build surface 14 and the individual irradiation units 28. In FIG. 6A, the irradiation arrangement 22 is arranged outside the process chamber 100 and emits beams 30 oriented substantially parallel to the build surface 14. These are deflected by means of a deflection device 110 in the form of a biaxial scanner device, in particular so that their points of impact on the build surface 14 can be established flexibly. Thus, for example, a deflection such that the beams 30 are associated with alternate individual regions 32 can take place for each workpiece layer to be produced or alternatively also during the production of an individual workpiece layer.

FIG. 6B shows an analogous principle, but in which the irradiation units 28 are configured according to the example of FIG. 3 and have additional optics units 50.

The invention claimed is:

1. A device for producing three-dimensional workpieces, wherein the device comprises:
    a build surface which is adapted to receive a molding compound; and
    an irradiation arrangement which is adapted to selectively irradiate the molding compound on the build surface with electromagnetic radiation in order to produce a workpiece by means of an additive layer manufacturing activity,
    wherein the irradiation arrangement comprises a plurality of irradiation units which are arranged stationarily within the irradiation arrangement and are unmovable parallel to the build surface,
    wherein the irradiation units are adapted to irradiate a respective associated individual region of the build surface,
    wherein the emitted beams of the irradiation units each have a cross-sectional area which corresponds to between 2% and 170% of the area of the respective associated individual region,
    wherein the irradiation units are adapted to emit the beams at an unchanged angle to generate predetermined irradiation patterns on the build surface according to a workpiece layer currently to be produced,
    wherein the irradiation arrangement comprises at each of its outer regions a fluid conducting region for generating a protective gas flow.

2. The device as claimed in claim 1, wherein the individual regions are so arranged that together they continuously cover at least a portion of the build surface.

3. The device as claimed in claim 2, wherein the irradiation units are arranged in matrix, lattice or network form within the irradiation arrangement.

4. The device as claimed in claim 1, wherein the control device is configured to control the intensity of the radiation emitted by the irradiation units according to a workpiece layer currently to be produced.

5. The device as claimed in claim 4, wherein the control device is configured to control the intensity of the irradiation units in such a manner that only selected ones of the plurality of irradiation units generate radiation that is effective for solidification.

6. The device as claimed in claim 1, wherein the irradiation units each comprise a radiation source.

7. A method for producing three-dimensional workpieces, by means of a device which comprises the following:
   a build surface which is adapted to receive a molding compound; and
   an irradiation arrangement which is adapted to selectively irradiate the molding compound on the build surface with electromagnetic radiation in order to produce a workpiece by means of an additive layer manufacturing method;
   wherein the irradiation arrangement comprises a plurality of irradiation units which are arranged stationarily within the irradiation arrangement and are unmovable parallel to the build surface, which irradiation units are adapted to irradiate a respective associated individual region of the build surface,
   wherein the method comprises the following steps:
   emitting a beam by at least selected ones of the plurality of irradiation units onto a respective individual region associated with the irradiation units, wherein the cross-sectional area of the emitted beams in each case corresponds to between 2% and 170% of the area of the respective associated individual region, wherein the plurality or irradiation units are adapted to emit the beams an unchanged angle,
   wherein the irradiation arrangement comprises at each of its outer regions a fluid conducting region for generating a protective gas flow.

8. The device as claimed in claim 1, wherein the emitted radiation of at least some of the irradiation units is concentrated by an additional optics unit to form a common beam.

9. The device as claimed in claim 1, wherein the beams strike the build surface at an unchangeable angle of from 20° to 160°.

10. The device as claimed in claim 1, wherein the irradiation units are arranged at predetermined distances relative to one another.

11. The device as claimed in claim 10, wherein the irradiation units are arranged at regular and/or equal distances relative to one another.

12. The device as claimed in claim 1, wherein the irradiation units have at least one surface emitter unit having in each case at least one laser beam-emitting diode and/or a laser beam-emitting semi-conductor.

13. The device as claimed in claim 1, wherein the control device is configured to control the plurality of stationary irradiation units to irradiate the molding compound one after the other and/or in a plurality of steps to produce the workpiece layer, in such a manner that, in a first irradiation step, a first portion of a workpiece layer to be produced is formed from the molding compound and, in a second irradiation step, a second portion of the workpiece layer to be produced is formed from the molding compound.

14. The device as claimed in claim 1, wherein the irradiation arrangement is movable relative to the build surface along a vertical movement axis.

* * * * *